United States Patent
Kang et al.

(10) Patent No.: US 11,513,896 B2
(45) Date of Patent: Nov. 29, 2022

(54) MANAGING A REDUNDANT ARRAY OF INDEPENDENT DISKS (RAID) USING ROW PARITY AND DIAGONAL PARITY

(71) Applicant: EMC IP Holding Company LLC, Hopkinton, MA (US)

(72) Inventors: Jianbin Kang, Beijing (CN); Jibing Dong, Beijing (CN); Hongpo Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 423 days.

(21) Appl. No.: 16/582,637

(22) Filed: Sep. 25, 2019

(65) Prior Publication Data
US 2020/0133774 A1    Apr. 30, 2020

(30) Foreign Application Priority Data
Oct. 31, 2018 (CN) .......................... 201811289419.8

(51) Int. Cl.
*G06F 11/10*     (2006.01)
*G06F 9/30*      (2018.01)
*G06F 3/06*      (2006.01)

(52) U.S. Cl.
CPC ........ *G06F 11/1076* (2013.01); *G06F 3/0619* (2013.01); *G06F 3/0653* (2013.01); *G06F 3/0689* (2013.01); *G06F 9/30029* (2013.01); *G06F 11/1004* (2013.01)

(58) Field of Classification Search
CPC ............. G06F 11/1076; G06F 11/1004; G06F 2211/1057; G06F 3/0619; G06F 3/0653; G06F 3/0689
See application file for complete search history.

(56) References Cited

U.S. PATENT DOCUMENTS 5,579,475 A * 11/1996 Blaum ................ G06F 11/1076
714/6.32
6,101,615 A *  8/2000 Lyons ................ G06F 11/1076
711/114

(Continued)

OTHER PUBLICATIONS

Evenodd: An efficient scheme for tolerating double disk failures in RAID architectures by Blaum, Brady, Bruck and Menon Published in: IEEE Transactions on Computers ( vol. 44, Issue: 2, Feb. 1995) https://ieeexplore.ieee.org/stamp/stamp.jsp?tp=&arnumber=364531&tag=1 (Year: 1995).*

*Primary Examiner* — Joseph O Schell
(74) *Attorney, Agent, or Firm* — BainwoodHuang

(57) ABSTRACT

Techniques manage data of a Redundant Array of Independent Disks (RAID). Such techniques involve: obtaining a first parity of checksum pair, which is determined based on a first checksum when user data of data disks in the RAID are predetermined values; determining, based on current checksums of the data disks in the RAID, a second parity of checksum pair of the RAID, the first parity of checksum pair and the second parity of checksum pair respectively comprising a row parity of checksum and a diagonal parity of checksum; and determining, based on the first parity of checksum pair and the second parity of checksum pair, a third parity of checksum pair for updating parity data of parity disks of the RAID.

15 Claims, 7 Drawing Sheets

(56) References Cited

U.S. PATENT DOCUMENTS

| | | | |
|---|---|---|---|
| 6,282,671 B1* | 8/2001 | Islam | G06F 11/1076 711/114 |
| 7,613,984 B2* | 11/2009 | Goel | G06F 11/1076 714/770 |
| 8,095,577 B1 | 1/2012 | Faibish et al. | |
| 8,341,342 B1* | 12/2012 | Bonwick | G06F 11/1076 711/103 |
| 9,026,729 B1* | 5/2015 | Hallak | G06F 11/1076 711/114 |
| 9,229,796 B1 | 1/2016 | Ma et al. | |
| 9,804,939 B1* | 10/2017 | Bono | G06F 3/0689 |
| 10,452,606 B1 | 10/2019 | Armangau et al. | |
| 10,521,137 B1 | 12/2019 | Xu et al. | |
| 10,585,855 B1 | 3/2020 | Armangau et al. | |
| 2005/0278612 A1* | 12/2005 | Edirisooriya | G06F 11/1076 714/800 |
| 2015/0254128 A1* | 9/2015 | Satoyama | G06F 11/085 714/15 |
| 2016/0034719 A1* | 2/2016 | Choi | G06F 12/1408 713/193 |

\* cited by examiner

MANAGING A REDUNDANT ARRAY OF INDEPENDENT DISKS (RAID) USING ROW PARITY AND DIAGONAL PARITY

CROSS-REFERENCE TO RELATED APPLICATION

This application claims priority to Chinese Patent Application No. CN201811289419.8, on file at the China National Intellectual Property Administration (CNIPA), having a filing date of Oct. 31, 2018, and having "METHOD, DEVICE AND PROGRAM PRODUCT FOR MANAGING DATA OF RAID" as a title, the contents and teachings of which are herein incorporated by reference in their entirety.

FIELD

Embodiments of the present disclosure relate to data management method and device of storage devices, and more specifically, to a method, a device and a computer program product for managing data of Redundant Array of Independent Disks.

BACKGROUND

At present, in order to enhance fault-tolerance of disks of the storage device, two independent parity disks based on various check mechanism are configured in Redundant Array of Independent Disks (RAID). For example, RAID 6 is configured therein with two parity disks based on various check mechanisms, i.e., disk P and disk Q. Compared with RAID 5, due to RAID 6 is configured with two independent check mechanisms with different algorithms, the fault-tolerance capability of disks is enhanced and the reliability of stored data is improved.

In the traditional solution for data management of Redundant Array of Independent Disks, due to the presence of the two different check algorithms, even if data on data disks are identical, two different Parity of Checksums (POCs) may also be acquired in some special circumstances. For example, when all user data of data disks of the RAID 6 are 0, the two Parity of Checksum (POC) on disk P and disk Q of the RAID may be initial Parity of Checksum (ZeroPOC) or calculated Parity of Checksum (SetPOC) determined based on the check algorithm. Accordingly, the POC cannot be determined uniquely. Consequently, in case of degradation and/or failure of the parity disks in the RAID, the POC during the procedure of data recovery or reconstruction cannot be determined uniquely, which further leads to data loss during the reconstruction procedure.

SUMMARY

The present disclosure provides method and system for data management of Redundant Array of Independent Disks, which can effectively lower the risks of data loss during the data recovery procedure.

In accordance with a first aspect of the present disclosure, there is provided a method of data management of Redundant Array of Independent Disks (RAID). The method includes: obtaining a first parity of checksum pair, the first parity of checksum pair being determined based on a first checksum when user data of data disks in the RAID are predetermined values; determining, based on current checksums of the data disks in the RAID, a second parity of checksum pair of the RAID, the first parity of checksum pair and the second parity of checksum pair including a row parity of checksum and a diagonal parity of checksum, respectively; and determining, based on the first parity of checksum pair and the second parity of checksum pair, a third parity of checksum pair for updating parity data of parity disks of the RAID.

In accordance with a second aspect of the present disclosure, there is provided a device for data management of Redundant Array of Independent Disks (RAID). The device includes: a memory configured to store one or more programs; a processing unit coupled to the memory and configured to execute the one or more programs to cause the device to perform a plurality of actions including: obtaining a first parity of checksum pair, the first parity of checksum pair being determined based on a first checksum when user data of data disks in the RAID are predetermined values; determining, based on current checksums of the data disks in the RAID, a second parity of checksum pair of the RAID, the first parity of checksum pair and the second parity of checksum pair including a row parity of checksum and a diagonal parity of checksum, respectively; and determining, based on the first parity of checksum pair and the second parity of checksum pair, a third parity of checksum pair for updating parity data of parity disks of the RAID.

In accordance with a third aspect of the present disclosure, there is provided a computer program product. The computer program product being tangibly stored on a non-transient computer-readable medium and includes machine-executable instructions, the machine-executable instructions, when executed, causing a machine to perform steps of the method according to the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more details below with reference to the drawings. Although the drawings illustrate preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can include other explicit and implicit definitions.

Figure 1:
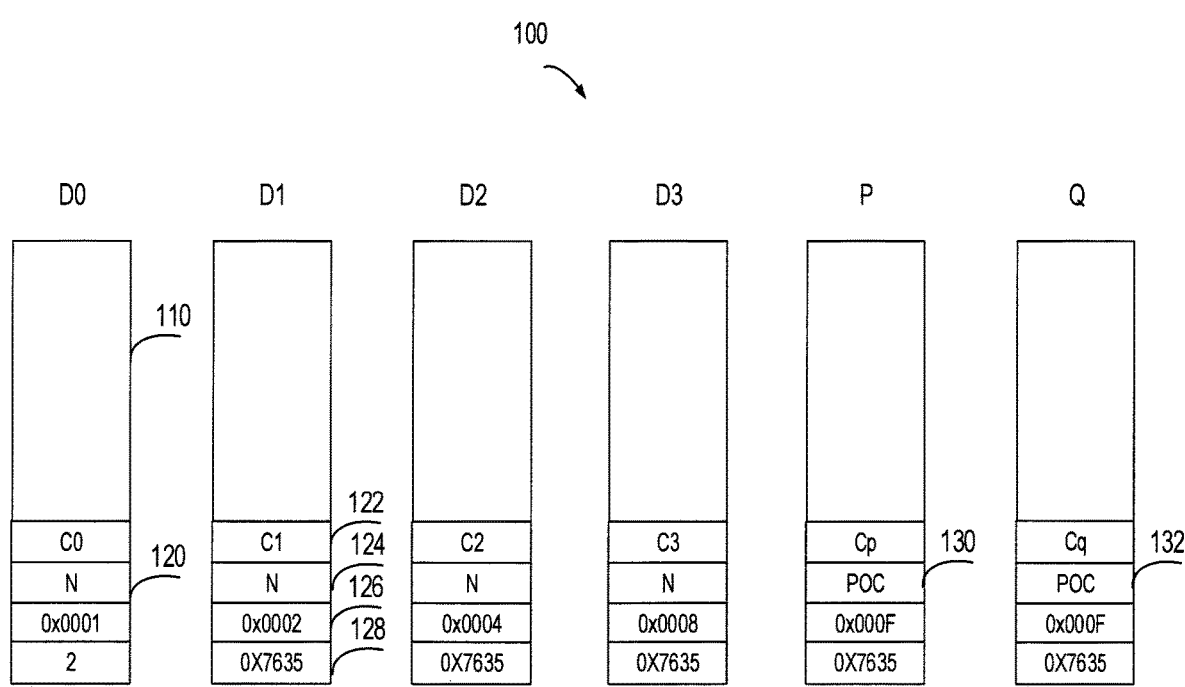
FIG. 1 illustrates a schematic diagram of a traditional Redundant Array of Independent Disks 100.

Deficiencies in the traditional solution of managing data of Redundant Array of Independent Disks and the reasons for the deficiencies will be analyzed in details as below. FIG. 1 illustrates a schematic diagram of a traditional Redundant Array of Independent Disks 100. As shown in FIG. 1, the Redundant Array of Independent Disks 100 includes a plurality of disks, e.g., RAID 6 including 6 disks (4 of which are data disks and 2 of which are parity disks). The four data disks, for example, respectively are disk D0, disk D1, disk D2 and disk D3. Two parity disks, for example, respectively are disk P and disk Q, wherein disk P is also referred to as "row parity disk" and disk Q is also known as "diagonal disk." The sector size of each disk, for example, is 520 bytes including 512-byte user data 110 and 8-byte metadata 120. The above 8-byte metadata 120 usually are divided into 4 parts, which specifically include: 2-byte Checksum 122, 2-byte Logical Block Address stamp (LBA stamp) 124, 2-byte Write stamp 126 and 2-byte Time stamp 128. The LBA stamp is XOR of a logical block address of the disk sector, which is used for checking whether the RAID group reads the correct sector. The logical block address stamp of data disks in the same stripe is identical. The Write stamp and the Time stamp are combined together to detect incomplete data write. The 2-byte LBA stamp in the metadata of the disk P and the disk Q is provided for storing Parity of Checksum (POC) 130 and 132. The POC in the disk P and the POC in the disk Q are calculated based on different check algorithms.

In the traditional solution for data management of the RAID, when the RAID is bound, the system will format the data on all disks of the RAID to an initiating Mode. Table 1 as below illustrates checksum of data disks and POC of the parity disks under the initiating Mode. In the above initiating Mode, the checksums of the respective data disks are all 0x5EED; the POC of the disk P is 0; and the POC of the disk Q is also "0". POC is now referred to as Initial Parity of Checksum (ZeroPOC). Under the initiating Mode, the value of the ZeroPOC does not vary along with the width of the RAID (i.e., the number of disks in the RAID).

TABLE 1

|  | Raid Width | | | | |
| --- | --- | --- | --- | --- | --- |
|  | 4 | 5 | 6 | 7 | 8 |
| Data Disk Checksum | 0x5EED | 0x5EED | 0x5EED | 0x5EED | 0x5EED |
| POC on Disk P | 0x0000 | 0x0000 | 0x0000 | 0x0000 | 0x0000 |
| POC on Disk Q | 0x0000 | 0x0000 | 0x0000 | 0x0000 | 0x0000 |

Table 2 below illustrates checksum of data disks and POC of parity disks when data "0" is written into the stripes of the RAID. In Table 2, when "0" is written into the user data, the checksums on the data disks are still 0x5EED and the POC of disk P and the POC of disk Q are calculated respectively based on different check algorithms of the RAID6. The POC at this time is known as "Set Parity of Checksum (SetPOC)." Since the check algorithm is related to the width of the RAID, the SetPOC is varied with the RAID width and differs from the ZeroPOC under the initiating Mode.

TABLE 2

|  | Raid Width | | | | |
| --- | --- | --- | --- | --- | --- |
|  | 4 | 5 | 6 | 7 | 8 |
| Data Disk Checksum | 0x5EED | 0x5EED | 0x5EED | 0x5EED | 0x5EED |
| POC0 on Disk P | 0x0000 | 0x5EED | 0x0000 | 0x5EED | 0x0000 |
| POC on Disk Q | 0x8E64 | 0x19DF | 0xADFD | 0xF7EC | 0x251B |

Through the comparison between the above Table 1 and Table 2, it is known that even though the data on data disks are all "0," the zero stripe corresponds to different POCs when it is "initiating stripe" or "zero-filled stripe", which means that there are two different and effective POCs for the zero Mode. Therefore, in the traditional solution for data management of the RAID, it is required to set additional steps in all data read/write/rebuild paths to process the zero stripe, to check whether the data on all disks match with the zero Mode and whether the data on the disks P and Q match with the zero Mode, which will clearly increase code complexity. Furthermore, in some particular cases, when the disk P and/or disk Q degrade, the degraded POC needs to be rebuilt on the degraded stripe. If one parity disk is being rebuilt while the other parity disk is missing, data cannot be read from the two parity disks. Accordingly, the POC of the parity disks can be recovered depending on the checksum of the data disks only. At this time, if the data on all data disks are "0", the parity disk being rebuilt is set to ZeroPOC, while the other missing parity disk may be determined as either SetPOC or ZeroPOC. The traditional solution may recover the data based on the one possible POC selected, which results into data inconsistency in two parity disks, and further causes data loss.

To sum up, the traditional solution for data management of the RAID has many deficiencies. For example, it is complicated for the traditional solution to set additional steps in the data read/write/rebuild paths to process the zero stripe. For another example, the traditional solution causes data loss during the data recovery procedure.

To at least partially solve one or more of the above problems and other potential problems, example embodiments of the present disclosure provide a solution for data management of the RAID. First of all, a first Parity of Checksum (POC) pair is acquired, wherein the first POC pair is determined based on a first checksum when the user data of the data disks in the RAID are predetermined values; then, a second POC pair of the RAID is determined based on a current checksum of the data disks in the RAID, the first POC pair and the second POC pair respectively include a row POC and a diagonal POC; and a third POC pair is determined based on the first POC pair and the second POC pair to update the parity data of the parity disks in the RAID. In the above solution, the third POC pair for updating the parity data of the parity disks in the RAID is determined by using the first POC pair determined based on the first checksum when the user data of the respective data disks are predetermined values, and the second POC pair determined based on the current checksum of the data disks in the RAID. Therefore, when the RAID is with data "0", a third Parity of Checksum (CookPOC) of the parity disks of the RAID is identical to the ZeroPOC. The value of the updated POC of the parity disks is unique and identical to ZeroPOC when the respective data disks of the RAID include data "0". Accordingly, no additional steps are set in the data read/write/rebuild paths to process the zero stripe, which makes the software design quite simple, and no data loss is caused during the data recovery procedure as the POC value is unique.

Figure 2:
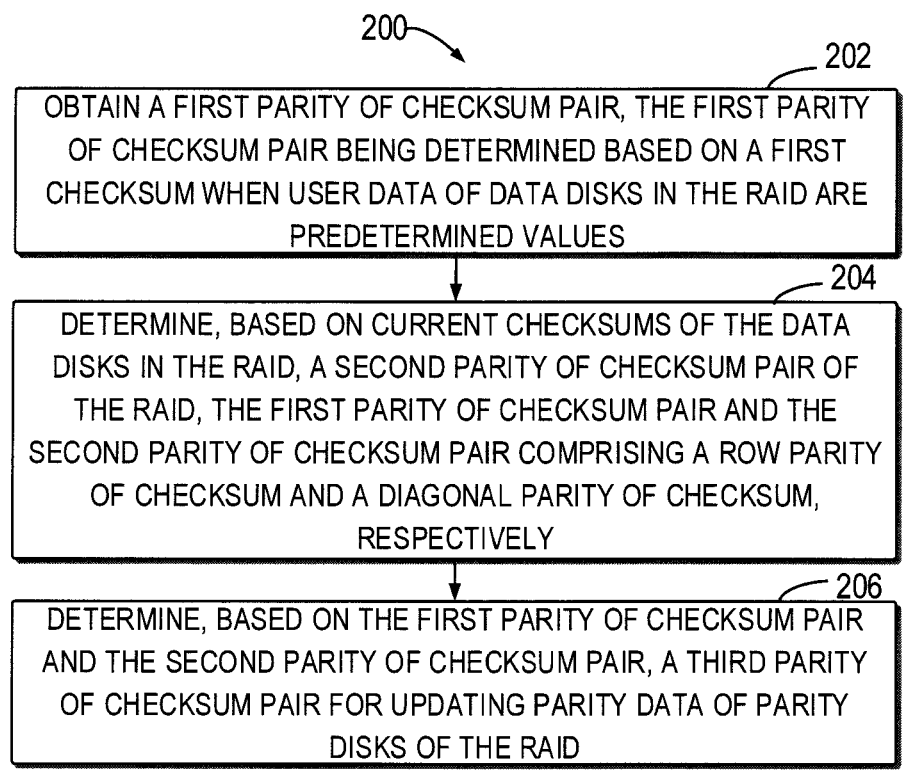
FIG. 2 illustrates a flowchart of a method 200 of data management of the RAID in accordance with embodiments of the present disclosure.
Figure 3:
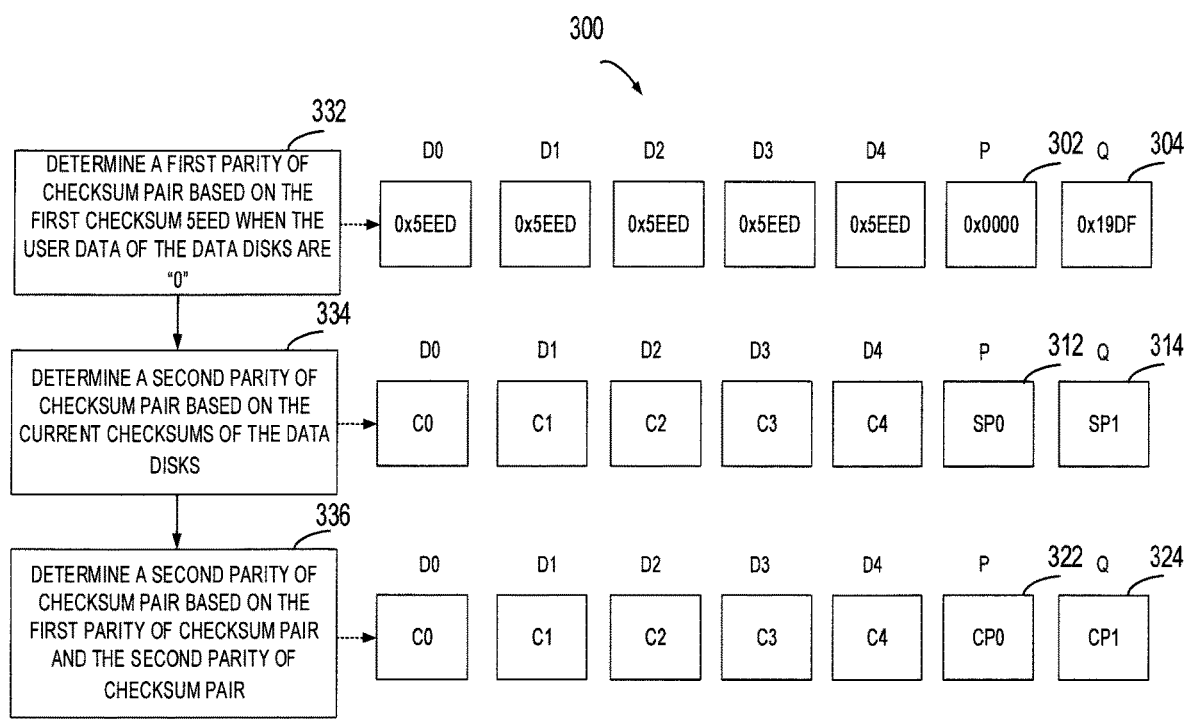
FIG. 3 illustrates a schematic diagram 300 of POC data change in the data management method according to embodiments of the present disclosure.

FIG. 2 illustrates a flowchart of a method 200 of data management of the RAID in accordance with embodiments of the present disclosure. In the embodiments illustrated by FIG. 2, respective actions, for example, are performed by the processor shown in FIG. 8. The method 200 also can include additional actions not shown and/or omit the shown actions. The scope of the present disclosure is not restricted in this regard. In addition, FIG. 3 illustrates a schematic diagram of POC data change in the data management method in accordance with embodiments of the present disclosure. In order to explain the influence of the actions of the method 200 over the POC of the parity disks of the RAID, the various actions of the method 200 will be described below with reference to data change shown in FIG. 3.

At block 202, the first POC pair is acquired, wherein the first POC pair is determined based on a first checksum when the user data of the data disks in the RAID are predetermined values. The first POC pair also may be referred to as Preset POC (Preset POC). The first POC pair, for example, includes two Preset POC, respectively being Preset POC of the disk P and Preset POC of the disk Q. In some embodiments, the above predetermined values, for example, are "0". In some embodiments, the first POC pair is varied with the widths of the RAID. Table 3 below illustrates the first checksum and the first POC pair under different Widths of the RAID. According to the data in Table 3, when the RAID width is 4, the first POC pair is (0x0000, 0x8E64); when the RAID width is 5, the first POC pair is (0x5EED, 0x19DF); when the RAID width is 8, the first POC pair is (0x0000, 0x251B). Accordingly, the values of the first POC pair are varied with different widths of the RAID. The Preset POC of the disk P and the Preset POC of the disk Q match with the width of the RAID. In some embodiments, the first POC pair are calculated during the startup of the RAID, and are saved in a memory.

TABLE 3

| | RAID Width | | | | |
|---|---|---|---|---|---|
| | 4 | 5 | 6 | 7 | 8 |
| First Checksum | 0x5EED | 0x5EED | 0x5EED | 0x5EED | 0x5EED |
| Preset POC on Disk P | 0x0000 | 0x5EED | 0x0000 | 0x5EED | 0x0000 |
| Preset POC on Disk Q | 0x8E64 | 0x19DF | 0xADFD | 0xF7EC | 0x251B |

In some embodiments, the acquisition of the first POC pair includes: performing an XOR operation on the first checksum to acquire a first row POC; and performing an even-odd algorithm on the first checksum to acquire a first diagonal POC. In some embodiments, an XOR operation is performed on the first checksum (e.g., 0x5EED) when the user data of the respective data disks are 0, to acquire the Preset POC of the disk P; and an even-odd operation is performed on the respective first checksums to acquire the Preset POC of the disk Q. The even-odd operation also can be known as a diagonal parity operation, which is obtained from the XOR operation on the corresponding diagonal data blocks and the regulating factors. Since the present disclosure does not involve the improvement of the even-odd operation per se, the detailed algorithm of the even-odd operation will not be repeated. In some embodiments, for example, when the RAID width is 5, if the user data of the respective disks D0 to D4 are 0x0000 in the RAID, the first checksums of the respective data disks are 0x5EED, as shown in FIG. 3. At block 332, the first POC pair is determined based on the first checksum when the user data of the data disks are "0". Specifically, in order to acquire the Preset POC of the disk P, i.e., the row POC 302, the XOR operation is performed on the first checksums (0x5EED) of the respective data disks, and the acquired row POC 302 is 0x0000. In order to acquire the Preset POC of the disk Q, i.e., the diagonal POC 304, the even-odd operation is performed on the first checksums (0x5EED) of the respective data disks, and the acquired diagonal POC 304 is 0x19DF. At this time, the first POC pair is (0x0000, 0x19DF).

At block 204, the second POC pair of the RAID is determined based on the current checksum of the data disks in the RAID, wherein the first POC pair and the second POC pair respectively include a row POC and a diagonal POC. In some embodiments, the second POC pair of the RAID is calculated based on the current checksum of the data disks by using the row XOR operation check algorithm and the even-odd operation of the RAID6 respectively. At block 334, the second POC pair is determined based on the current checksum of the data disks. Specifically, when the width of the RAID is 5, the current checksum of the data disks, for example, is C0, C1, C2, C3 and C4 respectively; the row POC 312 (i.e., Set POC of disk P) and the diagonal POC 314 (i.e., Set POC of disk Q) in the second POC pair of the RAID are calculated based on the current checksums C0 to C4 of the respective disks by using the check algorithm of the RAID 6. In FIG. 3, the Set POC of disk P, for example, is SP0 and the Set POC of disk Q, for example, is SP1.

At block 206, a third POC pair is determined based on the first POC pair and the second POC pair, to update the parity data of the parity disks of the RAID. In some embodiments, determining the third POC pair includes: performing the XOR operation on the first POC pair and the second POC pair to acquire the third POC pair. In some embodiments, the row POC (i.e., Set POC of disk P) and the diagonal POC (i.e., Set POC of disk Q) comprised in the acquired third POC pair are respectively stored in the row parity disk (i.e., disk P) and the diagonal parity disk (i.e., disk Q) of the RAID. According to FIG. 3, the third POC pair is determined based on the first POC pair and the second POC pair. Specifically, the XOR operation is performed on the Preset POC and the Set POC of the disk P to acquire the row POC 322 in the third POC pair, i.e., Cook POC of disk P; and the XOR operation is performed on the Preset POC and the Set POC of the disk Q to acquire the diagonal POC 324 in the third POC pair, i.e., Cook POC of disk Q. The third POC pair is (CP0, CP1) as shown in FIG. 3.

Table 4 below illustrates the POC pair of the method 200 according to the embodiments of the present disclosure under different widths of the RAID. According to the data in Table 4, the second POC pair, i.e., SetPOC, is varied with different widths of the RAID. However, the third POC pair (i.e., CookPOC) determined on the basis of the first POC pair and the second POC pair is identical to the initial POC (i.e., ZeroPOC) under the initiating mode when the user data of the data disks are "0". Besides, the third POC pair is irrelevant to the width of the RAID, which makes "initiating zero Mode" of disk P or disk Q associated with ZeroPOC an effective RAID parity pattern.

TABLE 4

| | RAID WIDTH | | | | |
|---|---|---|---|---|---|
| | 4 | 5 | 6 | 7 | 8 |
| ZeroPOC of Disk P | 0000 | 0000 | 0000 | 0000 | 0000 |
| ZeroPOC of Disk Q | 0000 | 0000 | 0000 | 0000 | 0000 |
| SetPOC of Disk P | 0000 | 5EED | 0000 | 5EED | 0000 |
| SetPOC of Disk Q | 0x8E64 | 0x19DF | 0xADFD | 0xF7EC | 0x251B |
| CookPOC of Disk P | 0000 | 0000 | 0000 | 0000 | 0000 |
| CookPOC of Disk Q | 0000 | 0000 | 0000 | 0000 | 0000 |

In the above solution, the third POC pair for updating the parity data of the parity disks of the RAID are determined by using the first POC pair and the second POC pair. Accordingly, in case of zero data of the RAID, the POC of the parity disks of the RAID, i.e., CookPOC, has a unique value, and is identical to the ZeroPOC and irrelevant to the width of the RAID. Therefore, no additional steps are set in the data read/write/recovery paths to process the special circumstances which are brought by the differences between "initiating zero stripe" and "write zero stripe", which significantly simplifies the software design. Moreover, the issue of data loss caused by indeterminate value of the POC pair during the data recovery procedure also may be avoided.

Figure 4:
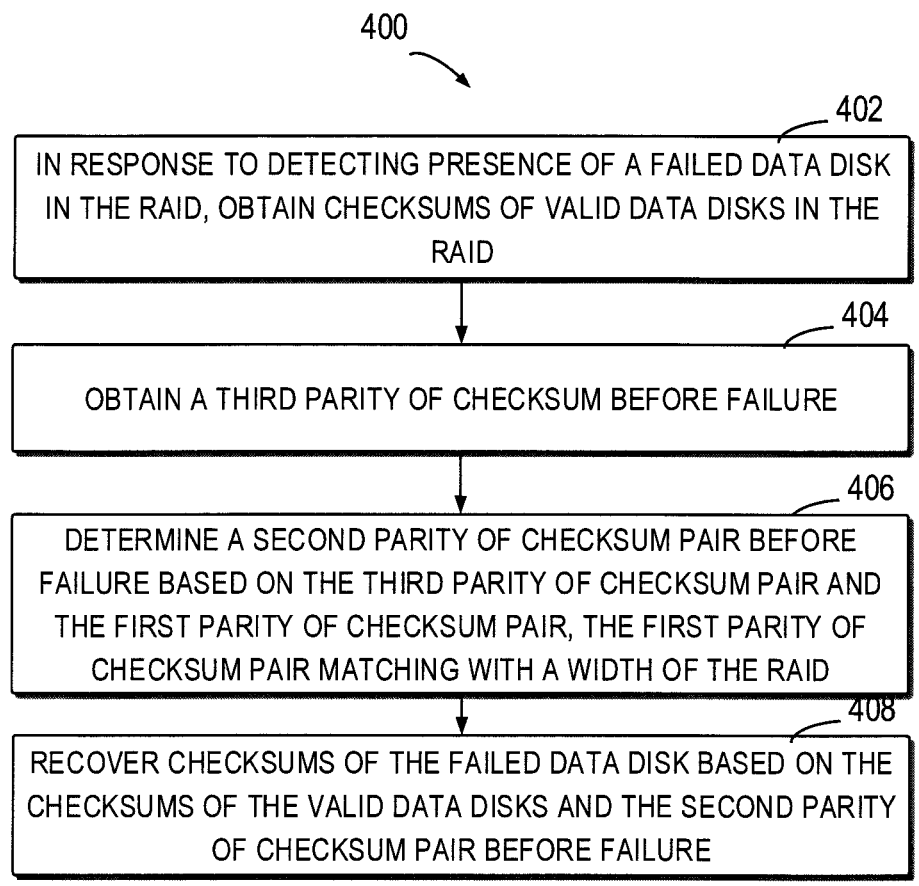
FIG. 4 illustrates a flowchart of a recovery method 400 of failed data disks of the RAID in accordance with embodiments of the present disclosure.

In some embodiments, the data management method 200 of the RAID also includes a method of recovering failed data disks in the RAID. FIG. 4 illustrates a flowchart of a method 400 of recovering failed data disks in the RAID in accordance with embodiments of the present disclosure. The method 400 also can include additional actions not shown and/or omit the shown actions. The scope of the present disclosure is not restricted in this regard.

At block 402, if a failed data disk in the RAID is detected, the checksum of the valid data disks in the RAID is acquired. Taking the RAID 6 (4+2) having a width of 6 in FIG. 1 as an example, if a failure of the data disk D0 of the RAID as shown in FIG. 1 is detected, the checksums C1, C2 and C3 on the remaining three data disks D1, D2 and D3 are read on the assumption that the data disks D1 to D3, disk P and disk Q are valid at this moment.

At block 404, the third POC pair before the failure is acquired. In some embodiments, the third POC pair before the failure is acquired by reading the third POC pair (CookPOC of disk P, CookPOC of disk Q) saved on the disks P and Q. Because the checksum of the failed data disk is recovered by means of the second POC pair (SetPOC) before failure, and the SetPOC cannot be acquired on account of the checksum of the failed data disk, the SetPOC before failure cannot be directly calculated based on the checksums of the respective disks. Therefore, it is required to recover the SetPOC before failure by the CookPOC before failure.

At block 406, the second POC pair before failure is determined based on the third POC pair and the first POC pair, and the first POC pair matches with the width of the RAID. In some embodiments, the XOR operation is performed on the acquired third POC pair and the second POC pair to acquire the second POC pair (SetPOC of disk P, SetPOC of disk Q) before failure.

At block 408, the checksum of the failed data disks is recovered based on the checksum of the valid data disks and the second POC pair before failure. For example, the checksum C0 of the failed data disk D0 is acquired, via the XOR operation, based on the checksums C1, C2 and C3 of the data disks D1, D2 and D3, the SetPOC of disk P and the SetPOC of disk Q.

Figure 5:
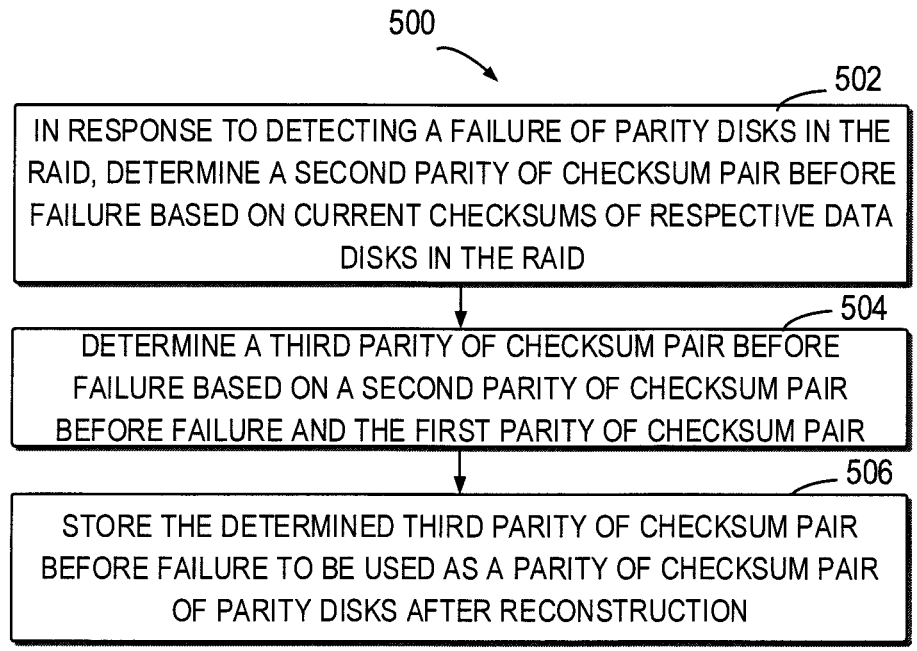
FIG. 5 illustrates a flowchart of a recovery method 500 of failed parity disks of the RAID in accordance with embodiments of the present disclosure.

In some embodiments, the method 200 of data management of the RAID also includes a method of recovering failed parity disks in the RAID. FIG. 5 illustrates a flowchart of a method 500 for recovering failed parity disks in the RAID in accordance with embodiments of the present disclosure. The method 500 also can include additional actions not shown and/or omit the shown actions. The scope of the present disclosure is not restricted in this regard.

At block 502, in response to detecting failure of parity disks in the RAID, the second POC pair before failure is determined based on the current checksums of the respective disks in the RAID. Taking the RAID 6 (4+2) having a width of 6 in FIG. 1 as an example, if a failure of disk P and/or disk Q in the RAID is detected, the checksums C1, C2, C3 and C4 on four data disks D1, D2, D3 and D4 are read on the assumption that the data disks D1 to D4 are valid at this moment.

At 504, the third POC pair before failure is determined based on the second POC pair before failure and the first POC pair, wherein the first POC pair matches with the width of the RAID. In some embodiments, first, the second POC pair (SetPOC of disk P, SetPOC of disk Q) is calculated, via the check algorithm of the RAID 6, based on the current respective checksums of the data disks. Then, the first POC pair matching with the width of the RAID is acquired. For example, through table look-up, the Preset POC of disk P matching with the RAID having a width of 6 is 0x0000 and the Preset POC of disk Q matching with the RAID having a width of 6 is 0xADFD. Afterwards, the third POC pair before failure (CookPOC of disk P, CookPOC of disk Q) are determined based on the first POC pair and the calculated second POC pair. For example, the CookPOC of disk P is acquired by performing the XOR operation on the Preset-POC (0x0000) of disk P and the SetPOC of disk P; the CookPOC of disk Q is acquired by performing the XOR operation on the PresetPOC (0xADFD) of disk Q and the SetPOC of disk Q.

At block 506, the third POC pair before failure is stored to be used as the POC pair of the reconstructed parity disks. For example, the above calculated third POC pair (CookPOC of disk P, CookPOC of disk Q) is the POC data of the reconstructed disks P and Q.

In the above solution, the third POC pair for updating the parity data of the parity disks of the RAID is determined by using the first POC pair and the second POC pair, such that the value of the POC of the parity disks is unique and equal to ZeroPOC in case of zero data of the RAID. Therefore, no additional steps are set in the data recovery path to process "zero data stripe."

However, during the data recovery procedure of the traditional method of data management of the RAID, when disk P and/or disk Q degrade and rebuild are performed on the degraded stripe, it is required to perform the following actions to process "zero data stripe." First of all, it is confirmed whether the data on all disks match with zero Mode; if not, a conventional test algorithm of the RAID 6 is used to update the POC to SetPOC; next, if it is confirmed there is P disk or Q disk without degradation, the data on the P disk or Q disk without degradation is detected; if the detected data do not match with "initiating zero Mode," a conventional test algorithm of the RAID 6 is employed to update the POC to SetPOC; then, the POC of the parity disks (P or Q or both) during reconstruction is set to "initiating zero Mode," i.e., ZeroPOC. In the above traditional data recovery method, if one parity disk is being rebuilt and the other parity disk is absent, the POC is rebuilt solely based on the checksums of all data disks. If all data disks include the zero Mode at this time, the parity disk during reconstruction is set to ZeroPOC while the other missing parity disk is either SetPOC or ZeroPOC. At this point, the parity data of the parity disks are inconsistent, which can easily result into data loss in the rebuild procedure.

Table 5 below illustrates comparison between the traditional data management method and the data management method according to embodiments of the present disclosure regarding POC rebuild value and consistency. Referring to Table 5, in accordance with the traditional data management method, when one parity disk is being rebuilt and the other parity disk is absent, and all data disks include the zero Mode, the POC of the parity disks during reconstruction may be rebuilt to two inconsistent values. However, in accordance with the data management method of the embodiments of the present disclosure, when all data disks include the zero Mode, the POC can be rebuilt to a unique value only, and the inconsistency situation is avoided. Therefore, the data management method of the embodiments of the present disclosure can effectively avoid data loss which is caused by the lack of uniqueness of the POC rebuild value during the data rebuild procedure.

TABLE 5

| POC on Disk P | POC on Disk Q | Traditional data management method | | Data management method of embodiments of present disclosure | |
| --- | --- | --- | --- | --- | --- |
| | | Is it possible to rebuild the POC to this value? | POC consistency? | Is it possible to rebuild the POC to this value? | POC consistency? |
| 0000 | 0000 | Possible | Consistent | Possible | Consistent |
| 5EED | 0000 | Possible | Inconsistent | Impossible | — |
| 0000 | 19DF | Possible | Inconsistent | Possible | — |
| 5EED | 19DF | Possible | Consistent | Possible | — |

Furthermore, compared with the traditional data management method, the data management method of embodiments of the present disclosure do not need to set additional steps in the data recovery path to process the zero stripe, which makes software design quite simple.

Figure 6:
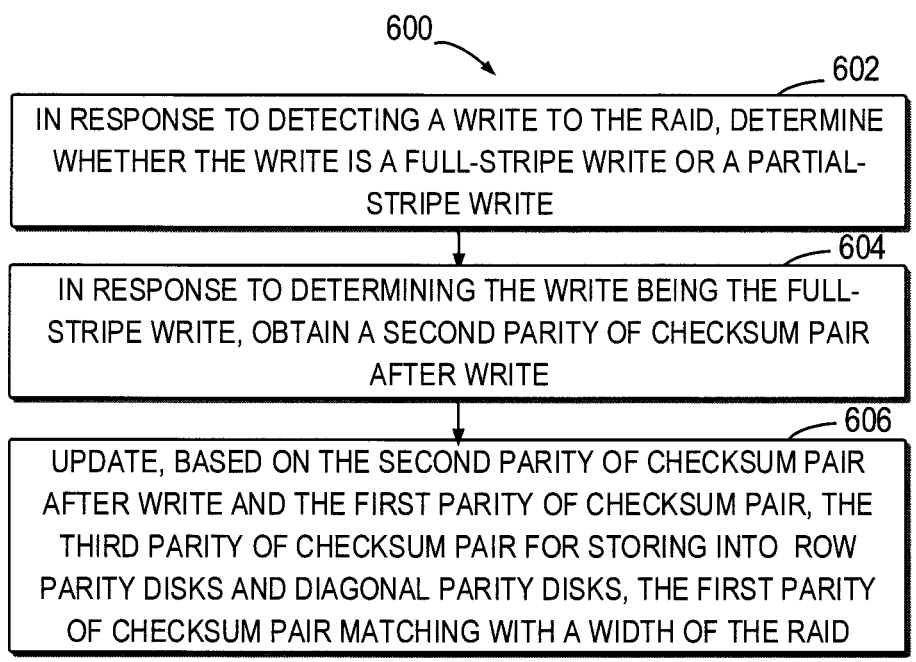
FIG. 6 illustrates a flowchart of a method 600 of full-stripe data write of the RAID in accordance with embodiments of the present disclosure.

In some embodiments, the method 200 of data management of the RAID further includes a method of writing data into the RAID. FIG. 6 illustrates a flowchart of a method 600 of full-stripe write of the RAID in accordance with embodiments of the present disclosure. The method 600 also can include additional actions not shown and/or omit the shown actions. The scope of the present disclosure is not restricted in this regard.

RAID, which is composed of a plurality of disks, stores, in a distributed manner, the data in blocks into the plurality of disks through data striping techniques, so as to parallel process the data. Accordingly, data write and data read can be performed simultaneously on the plurality of disks, which can effectively enhance the overall I/O performance. The method 600 for writing data into the full-stripe of the RAID will be explained as below with reference to FIG. 6.

At block 602, if a write to the RAID is detected, it is determined whether the write is for the full-stripe or a parity stripe. The write type of the RAID can include: Full-Stripe Write and Partial-Stripe Write. When the write type of the RAID is full-stripe write, each IO occupies nearly all disks, and each unit on every stripe is accordingly write-updated. When the write type of the RAID is a partial-stripe write, e.g., Read-Modify Write, it is required to modify the data of a part of the units. By determining the write type of the RAID at first, a calculation approach of the parity data may be matched with the write type of the RAID. In some embodiments, it is determined, based on the write stamp and the time stamp in the RAID metadata, whether the write is the full-stripe write or the partial-stripe write. For example, when the write IO is for the full-stripe, the write stamp 128 in the RAID metadata shown by FIG. 1 is "0"; when the write IO is the partial-stripe write, the corresponding write stamp of the disks which are written is flipped to "1", and the corresponding write stamp changed to "0" when the write is performed again. Furthermore, when the write IO is for the full-stripe, the time stamp of all disks is consistent; if the write is not the full-stripe write, the time stamp of the corresponding disk which is written is a special value, e.g., all the bits set to "1".

At block 604, if the write is determined to for the full-stripe, a second POC pair after write is acquired. During the full-stripe write, as each unit on every stripe is write-updated, the second POC pair after write can be directly calculated by using the updated data disk checksum. In some embodiments, an updated checksum is acquired based on the updated user data; and the SetPOC of disk P and the SetPOC of disk Q in the second POC pair after write are respectively determined based on the updated checksum by using the check algorithm of the RAID 6.

At block 606, the third POC pair is updated based on the second POC pair after write and the first POC pair, to store it into the row parity disk and the diagonal parity disk. The first POC pair matches with the width of the RAID. In some embodiments, after the third POC pair is calculated, the calculated third POC pair is written into the parity disks of the RAID when the user data are written into the data disks of the RAID.

Figure 7:
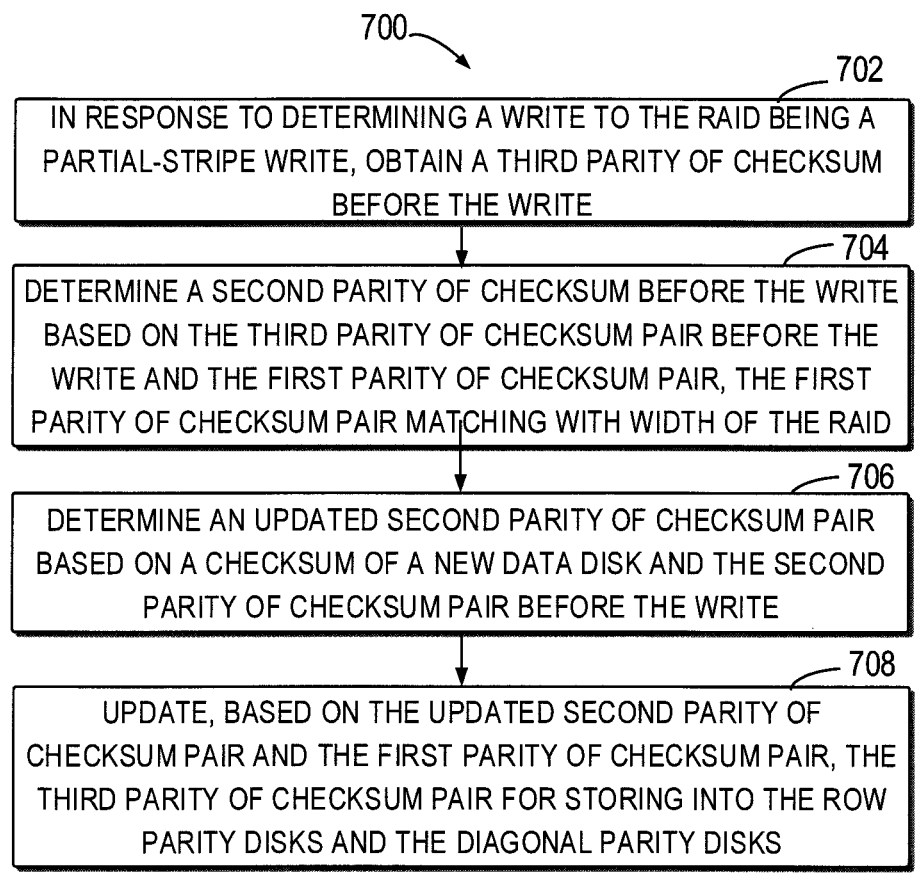
FIG. 7 illustrates a flowchart of a method 700 of partial-stripe data write of the RAID in accordance with embodiments of the present disclosure.

In some embodiments, the method 200 of data management of the RAID also includes a method of writing data into the partial-stripe of the RAID. FIG. 7 illustrates a flowchart of a method 700 of partial-stripe data write of the RAID in accordance with embodiments of the present disclosure. The method 700 also can include additional actions not shown and/or omit the shown actions. The scope of the present disclosure is not restricted in this regard.

At block 702, if the write for the RAID is determined to be a partial-stripe write, a third POC pair before the write before the write is acquired. In some embodiments, when the write type of the RAID is a partial-stripe write, not all data disks are involved. Accordingly, it is required to read, from disks P and Q, the stored third POC pair before the write, and update the third POC pair in accordance with the updated data.

At block 704, a second POC pair before the write is determined based on the third POC pair before the write and the first POC pair, wherein the first POC pair match with the RAID width. In some embodiments, the XOR operation is performed on the acquired third POC pair and the first POC pair to acquire the second POC pair before the write.

At block 706, the updated second POC pair is determined based on the checksum of the new data disk and the second POC pair before the write. In some embodiments, the updated second POC pair is determined based on the checksum before the write, the second POC pair before the write and the checksum of the new data disk.

At block 708, the third POC pair is updated based on the updated second POC pair and the first POC pair, to store it into the row parity disk and the diagonal parity disk. In some embodiments, the XOR operation is performed on the first POC pair and the updated second POC pair to acquire the updated third POC pair. Then, the updated third POC pair is stored into disks P and Q of the RAID.

Figure 8:
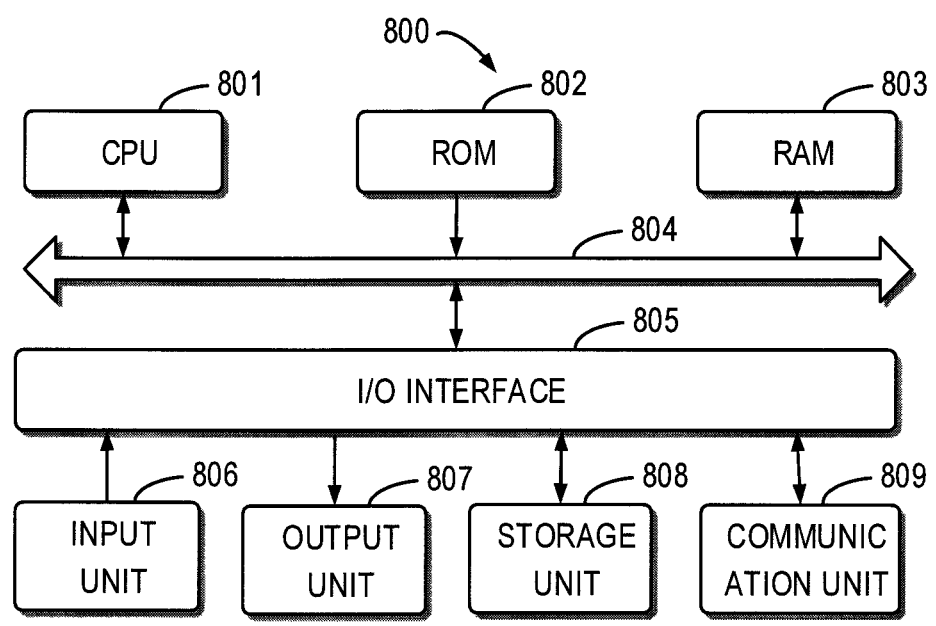
FIG. 8 schematically illustrates a block diagram of an electronic device 800 suitable for implementing embodiments of the present disclosure.

FIG. 8 schematically illustrates a block diagram of an electronic device 800 suitable for implementing embodiments of the present disclosure. The device 800 can be used for implementing the system which performs the methods 200, 400, 500, 600 and 700 shown in FIGS. 2 and 4-6. As shown, the device 800 includes a central process unit (CPU) 801, which can perform various suitable actions and processing based on the computer program instructions stored in the read-only memory (ROM) 802 or computer program instructions loaded in the random-access memory (RAM) 803 from a storage unit 808. The RAM 803 can also store all kinds of programs and data required by the operations of the device 800. CPU 801, ROM 802 and RAM 803 are connected to each other via a bus 804. The input/output (I/O) interface 805 is also connected to the bus 804.

A plurality of components in the device 800 is connected to the I/O interface 805, including: an input unit 806, such as keyboard, mouse and the like; an output unit 807, e.g., various kinds of display and loudspeakers etc.; a storage unit 808, such as disk, optical disk etc.; and a communication unit 809, such as network card, wireless transceiver and the like. The communication unit 809 allows the device 800 to exchange information/data with other devices via the computer network, such as Internet, and/or various telecommunication networks.

The processing unit 801 executes the above described various procedures and processing, such as method 200 of data management of redundant array of independent disks, method 400 of recovering failed data disks in the RAID, method 500 of recovering failed parity disks in the RAID, method 600 of writing data to a full-stripe of the RAID and method 700 of writing data to a partial-stripe of the RAID. For example, in some embodiments, methods 200, 400, 500, 600 and 700 can be implemented as computer software programs stored in the machine-readable medium, such as storage unit 808. In some embodiments, the computer program can be partially or fully loaded and/or mounted to the device 800 via ROM 802 and/or communication unit 809. When the computer program is loaded to RAM 803 and executed by the CPU 801, one or more actions of the above described methods 200, 400, 500, 600 and 700 can be executed. Alternatively, in other embodiments, the CPU 801 can be configured in any other suitable ways (e.g., by means of firmware) to execute one or more actions of the methods 200, 400, 500, 600 and 700.

It should be further explained that the present disclosure can be method, apparatus, and system and/or computer program product. The computer program product can include a computer-readable storage medium loaded with computer-readable program instructions for executing various aspects of the present disclosure.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, such as Smalltalk, C++ and the like, and traditional procedural programming languages, e.g., C language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Each aspect of the present disclosure is disclosed here with reference to the flow chart and/or block diagram of method, apparatus (system) and computer program product according to embodiments of the present disclosure. It should be understood that each block of the flow chart and/or block diagram and combinations of each block in the flow chart and/or block diagram can be implemented by the computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only by way of example rather than exhaustive and is not limited to the embodiments disclosed herein. Many modifications and alterations, without deviating from the scope and spirit of the explained various embodiments, are obvious for those skilled in the art. The selection of terms in the text aims to best explain principles and actual applications of each embodiment and technical improvements made to the technology in the market by each embodiment, or enable other ordinary skilled in the art to understand embodiments of the present disclosure The above embodiments are optical embodiments of the present disclosure and are not intended for restricting the present disclosure. For those skilled in the art, the present disclosure can have various changes and alterations. Any modifications, equivalent substitution, improvements and the like within the spirit and the principle of the present disclosure should be included within the protection scope of the present disclosure.

We claim:

1. A method of data management of a Redundant Array of Independent Disks (RAID), comprising:
    obtaining a first parity pair, the first parity pair being determined based on a first checksum when user data of data disks in the RAID are predetermined values, wherein obtaining the first parity pair includes
        performing an XOR operation on the first checksum to obtain a row parity of the first parity pair, and
        performing a diagonal parity operation including an XOR operation on diagonal data blocks of the predetermined values in the user data in the data disks in the RAID to obtain a diagonal parity of the first parity pair;
    determining, based on current checksums of the data disks in the RAID, a second parity pair of the RAID, wherein determining the second parity pair of the RAID includes
        performing an XOR operation on the current checksums of the data disks in the RAID to obtain a row parity of the second parity pair, and performing a diagonal parity operation including an XOR operation on diagonal data blocks of current user data in the data disks in the RAID to obtain a diagonal parity of the second parity pair; and determining, based on the first parity pair and the second parity pair, a third parity pair for updating parity data of parity disks of the RAID, at least in part by performing an XOR operation on the first parity pair and the second parity pair to obtain the third parity pair.

2. The method of claim 1, further comprising:
storing a row parity and a diagonal parity of the third parity pair into a row parity disk and a diagonal parity disk of the RAID respectively.

3. The method of claim 2, further comprising:
in response to detecting a write to the RAID, determining whether the write is a full-stripe write or a partial-stripe write;
in response to determining the write being the full-stripe write, obtaining a second parity pair after the write; and
updating, based on the second parity pair after write and the first parity pair, the third parity pair for storing into the row parity disk and the diagonal parity disk, the first parity pair matching with a width of the RAID.

4. The method of claim 2, further comprising:
in response to determining a write to the RAID being a partial-stripe write, obtaining a third parity pair before the write;
determining a second parity pair before the write based on the third parity pair before the write obtained in response to determining the write to the RAID being a partial-stripe write and the first parity pair, the first parity pair matching with a width of the RAID;
determining an updated second parity pair based on a checksum of a new data disk and the second parity pair determined before the write; and
updating, based on the updated second parity pair and the first parity pair, the third parity pair for storing into the row parity disk and the diagonal parity disk.

5. The method of claim 1, wherein the diagonal parity of the first parity pair is varied with different widths of the RAID.

6. The method of claim 1, further comprising:
in response to detecting a presence of a failed data disk in the RAID, obtaining checksums of valid data disks in the RAID;
obtaining a third parity pair before failure;
determining a second parity pair before failure based on the third parity pair obtained before failure and the first parity pair; and
recovering checksums of the failed data disk based on the checksums of the valid data disks in the RAID that were obtained in response to detecting the presence of the failed data disk in the RAID and the second parity pair determined before failure.

7. The method of claim 1, further comprising:
in response to detecting a failure of parity disks in the RAID, determining a second parity pair before failure based on current checksums of respective data disks in the RAID;
determining a third parity pair before failure based on the second parity pair determined before failure and the first parity pair, the first parity pair matching with a width of the RAID; and
storing the determined third parity pair before failure to be used as a parity pair of parity disks after a reconstruction.

8. A device for data management of a Redundant Array of Independent Disks (RAID), comprising:
a memory configured to store one or more programs;
a processing unit coupled to the memory and configured to execute the one or more programs to cause the device to perform acts comprising:
obtaining a first parity pair, the first parity pair being determined based on a first checksum when user data of data disks in the RAID are predetermined values, wherein obtaining the first parity pair includes
performing an XOR operation on the first checksum to obtain a row parity of the first parity pair, and
performing a diagonal parity operation including an XOR operation on diagonal data blocks of the predetermined values in the user data in the data disks in the RAID to obtain a diagonal parity of the first parity pair;
determining, based on current checksums of the data disks in the RAID, a second parity pair of the RAID, wherein determining the second parity pair of the RAID includes
performing an XOR operation on the current checksums of the data disks in the RAID to obtain a row parity of the second parity pair, and
performing a diagonal parity operation including an XOR operation on diagonal data blocks of current user data in the data disks in the RAID to obtain a diagonal parity of the second parity pair; and
determining, based on the first parity pair and the second parity pair, a third parity pair for updating parity data of parity disks of the RAID, at least in part by performing an XOR operation on the first parity pair and the second parity pair to obtain the third parity pair.

9. The device of claim 8, wherein the acts further comprise:
storing a row parity and a diagonal parity of the third parity pair into a row parity disk and a diagonal parity disk of the RAID respectively.

10. The device of claim 9, wherein the acts further comprise:
in response to detecting a write to the RAID, determining whether the write is a full-stripe write or a partial-stripe write;
in response to determining the write being the full-stripe write, obtaining a second parity pair after the write; and
updating, based on the second parity pair after write and the first parity pair, the third parity pair for storing into the row parity disk and the diagonal parity disk, the first parity pair matching with a width of the RAID.

11. The device of claim 9, wherein the acts further comprise:
in response to determining a write to the RAID being a partial-stripe write, obtaining a third parity pair before the write;
determining a second parity pair before the write obtained in response to determining the write to the RAID being a partial-stripe write based on the third parity pair before the write and the first parity pair, the first parity pair matching with a width of the RAID;
determining an updated second parity pair based on a checksum of a new data disk and the second parity pair determined before the write; and
updating, based on the updated second parity pair and the first parity pair, the third parity pair for storing into the row parity disk and the diagonal parity disk.

12. The device of claim 8, wherein the diagonal parity of the first parity pair is varied with different widths of the RAID.

13. The device of claim 8, wherein the acts further comprise:
   in response to detecting a presence of a failed data disk in the RAID, obtaining checksums of valid data disks in the RAID;
   obtaining a third parity pair before failure;
   determining a second parity pair before failure based on the third parity pair obtained before failure and the first parity pair; and
   recovering checksums of the failed data disk based on the checksums of the valid data disks in the RAID that were obtained in response to detecting the presence of the failed data disk in the RAID and the second parity pair determined before failure.

14. The device of claim 8, wherein the acts further comprise:
   in response to detecting a failure of parity disks in the RAID, determining a second parity pair before failure based on current checksums of respective data disks in the RAID;
   determining a third parity pair before failure based on the second parity pair determined before failure and the first parity pair, the first parity pair matching with a width of the RAID; and
   storing the determined third parity pair before failure to be used as a parity pair of parity disks after a reconstruction.

15. A computer program product having a non-transitory computer readable medium which stores a set of instructions to perform data management of a Redundant Array of Independent Disks (RAID); the set of instructions, when carried out by computerized circuitry, causing the computerized circuitry to perform a method of:
   obtaining a first parity pair, the first parity pair being determined based on a first checksum when user data of data disks in the RAID are predetermined values, wherein obtaining the first parity pair includes
      performing an XOR operation on the first checksum to obtain a row parity of the first parity pair, and
      performing a diagonal parity operation including an XOR operation on diagonal data blocks of the predetermined values in the user data in the data disks in the RAID to obtain a diagonal parity of the first parity pair;
   determining, based on current checksums of the data disks in the RAID, a second parity pair of the RAID, the first parity pair and the second parity pair comprising a row parity and a diagonal parity, respectively, wherein determining the second parity pair of the RAID includes
      performing an XOR operation on the current checksums of the data disks in the RAID to obtain a row parity of the second parity pair, and
      performing a diagonal parity operation including an XOR operation on diagonal data blocks of current user data in the data disks in the RAID to obtain a diagonal parity of the second parity pair; and
   determining, based on the first parity pair and the second parity pair, a third parity pair for updating parity data of parity disks of the RAID, at least in part by performing an XOR operation on the first parity pair and the second parity pair to obtain the third parity pair.

* * * * *